United States Patent
Wang

(10) Patent No.: US 11,519,054 B2
(45) Date of Patent: Dec. 6, 2022

(54) METHOD FOR PREPARING LEAD DIRECTLY FROM LEAD-CONTAINING MATERIAL BY SOLID PHASE REACTION

(71) Applicant: University of Science and Technology Beijing, Beijing (CN)

(72) Inventor: Chengyan Wang, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 559 days.

(21) Appl. No.: 16/576,765

(22) Filed: Sep. 20, 2019

(65) Prior Publication Data
US 2020/0377971 A1    Dec. 3, 2020

(30) Foreign Application Priority Data
May 27, 2019   (CN) .......................... 201910447576.5

(51) Int. Cl.
 *C22B 3/10* (2006.01)
 *C22B 3/22* (2006.01)
 (Continued)

(52) U.S. Cl.
 CPC ............... *C22B 13/04* (2013.01); *C22B 3/08* (2013.01); *C22B 3/10* (2013.01); *C22B 3/22* (2013.01); *C22B 7/007* (2013.01); *C22B 13/045* (2013.01)

(58) Field of Classification Search
 CPC .... C22B 7/00; C22B 7/02; C22B 7/04; C22B 7/006; C22B 7/007; C22B 3/00;
 (Continued)

(56) References Cited

U.S. PATENT DOCUMENTS

| | | | | | |
|---|---|---|---|---|---|
| 1,804,054 | A | * | 5/1931 | Hayward | ................ C22B 13/02 75/307 |
| 6,395,242 | B1 | * | 5/2002 | Allen | ........................ C22B 3/10 75/724 |
| 2011/0265969 | A1 | * | 11/2011 | Liu | ........................ H01M 10/54 164/76.1 |

FOREIGN PATENT DOCUMENTS

| | | | | |
|---|---|---|---|---|
| CN | 104120444 | A | * | 10/2014 |
| CN | 107674977 | A | * | 2/2018 ............. C01F 11/46 |

OTHER PUBLICATIONS

Steel Grinding Media, Sigma US, Jun. 23, 2017 (Year: 2017).*
(Continued)

*Primary Examiner* — Vanessa T. Luk
*Assistant Examiner* — Nikolas Takuya Pullen
(74) *Attorney, Agent, or Firm* — Bayramoglu Law Offices LLC

(57) ABSTRACT

A method for preparing lead directly from a lead-containing material by a solid phase reaction, includes: step 1, adding the lead-containing material to be processed to the grinder, and adding a metal substance and water to the grinder, wherein an activity of the metal substance is larger than that of lead; the solid phase reaction between the lead-containing material and the metal substance is caused directly by the grinder through a mechanical force to obtain a reaction product; step 2, washing and filtering the reaction product to obtain the lead and a metal salt solution corresponding to the metal substance; step 3, performing a melt casting on the lead to obtain a crude lead, crystallizing the metal salt solution to obtain a metal salt corresponding to the metal substance.

5 Claims, 1 Drawing Sheet

(51) Int. Cl.
*C22B 3/08* (2006.01)
*C22B 3/00* (2006.01)
*C22B 7/00* (2006.01)

(58) Field of Classification Search
CPC .... C22B 3/04; C22B 3/08; C22B 3/10; C22B 3/20; C22B 3/22; C22B 3/44; C22B 3/46; C22B 13/00; C22B 13/04; C22B 13/045; C22B 13/06; C22B 13/08; C22B 13/10; C22B 3/06; C22B 3/065; C22B 9/10; Y02W 30/84; C22C 1/1084; B22F 2009/041; B22F 2009/042; B22F 2009/043; B22F 2009/044; C25C 7/08
See application file for complete search history.

(56) References Cited

OTHER PUBLICATIONS

Ball Mill Loading—Wet Milling, Paul O. Abbe, Aug. 15, 2013 (Year: 2013).*
Zirconia (YSZ) Grinding Media, Inframat, Aug. 8, 2004 (Year: 2004).*
Dry Grinding VS Wet Grinding, 911 Metallurgist, May 25, 2017 (Year: 2017).*
Iron(III) oxide react with hydrogen chloride, Chemiday, Apr. 20, 2015 (Year: 2015).*
Iron (III) Oxide Summary, Pubchem, 2007 (Year: 2007).*
Lead Summary, Pubchem, 1992 (Year: 1992).*

* cited by examiner

METHOD FOR PREPARING LEAD DIRECTLY FROM LEAD-CONTAINING MATERIAL BY SOLID PHASE REACTION

CROSS REFERENCE TO THE RELATED APPLICATIONS

This application is based upon and claims priority to Chinese Patent Application No. CN201910447576.5, filed on May 27, 2019, the entire contents of which are incorporated herein by reference.

TECHNICAL FIELD

The present disclosure relates to the technical field of hydrometallurgy, particularly to a method for preparing lead directly from a lead-containing material by a solid phase reaction.

BACKGROUND

At present, the utilization of secondary lead resources has received more and more attention. Desulfurization conversion and pyrometallurgical smelting technology has been applied for the recycling of waste lead-acid battery lead paste with high lead content, but the pyrometallurgical process for processing the lead paste has high energy consumption costs, and produces atmospheric pollutants such as sulfur dioxide and volatile lead dust. In addition, various kinds of lead sulfate residues, lead chloride residues and lead oxide residues are produced during the non-ferrous metal smelting process, in a huge amount, however, owing to relatively low lead content (20% to 60%), the non-ferrous metal smelting process has not been effectively utilized.

In view of the environmental pollution and energy consumption cost of using pyrometallurgical process for processing lead residue, researchers have been working on the study of lead recycling by hydrometallurgy. The common method of hydrometallurgy includes: firstly, leaching the lead-containing material with various leaching agents to obtain a lead-containing solution, and then recycling lead from the solution by chemical precipitation, cementation or electrodeposition. Compared with pyrometallurgical methods, hydrometallurgical methods have certain advantages in terms of environment preservation and energy consumption costs, but there are also problems with long process flow, some leaching reagents such as fluosilicic acid, citric acid are expensive, and due to the low solubility of lead in the solution, a large liquid-solid ratio is required in the leaching process, which limits the processing capacity of the raw material. In the meantime, a large number of reactors and solution storage tanks are needed, which occupies more land resources. Moreover, the electrodeposition method has a problem of higher power consumption costs.

Therefore, it is necessary to develop a hydrometallurgical technique with short process flow, large processing capacity and low reagent cost.

SUMMARY

The technical problem to be solved by the present disclosure is to provide a method for preparing lead directly from a lead-containing material by a solid phase reaction, realizing a direct preparation of a high-content lead from lead paste or lead residue produced in metallurgical process, shortening the process flow, increasing the processing capacity, while meeting the environmental requirements of clean production.

In order to solve the above technical problem, a method for preparing lead directly from a lead-containing material by a solid phase reaction is provided by the embodiments of the present disclosure, and the method includes the following steps:

step 1, adding the lead-containing material to be processed to a grinder, and adding a metal substance and water to the grinder, wherein an activity of the metal substance is larger than that of lead; and the solid phase reaction between the lead-containing material and the metal substance is directly caused by the grinder through a mechanical force to obtain a reaction product;

step 2, washing and filtering the reaction product to obtain the lead and a metal salt solution corresponding to the metal substance;

step 3, performing a melt casting on the lead to obtain a crude lead, and crystallizing the metal salt solution to obtain a metal salt corresponding to the metal sub stance.

Preferably, the grinder is any one of a rod mill, a stirring mill, or a ball mill.

Preferably, the metal substance is any one of zinc, iron, or aluminum.

Preferably, the zinc is any one of or a combination of zinc powder, zinc sheets, and zinc particles; the iron is any one of or a combination of iron powder, scrap iron, iron wires, and iron sheets; and the aluminum is any one of or a combination of aluminum powder, aluminum sheets, aluminum foils, and aluminum wires.

Preferably, the metal salt solution is a sulfate solution or a chloride solution corresponding to the metal substance.

Preferably, the lead-containing material is a lead paste containing 60% to 75% of lead or a lead residue containing 20% to 60% of lead; the lead residue is any one of or a combination of lead sulfate residue, lead chloride residue and lead oxide residue.

Preferably, an amount of the metal substance is 0.9 to 1.5 times of a theoretical amount allowing the lead in the lead-containing material to react sufficiently.

Preferably, in step 1, a weight ratio of a grinding medium to the reaction material in the grinder is 2 to 20:1; a ratio of the water to the solid material is 0 to 5:1, and a unit of the ratio of water to the solid material is $m^3/t$, and a reaction time is 0.1 to 5 h.

Preferably, in step 1, when the lead-containing material is the lead paste or the lead oxide residue, sulfuric acid or hydrochloric acid is added to the water, and a pH of the solution is controlled at 1.0 to 5.0 during the reaction.

Preferably, in step 3, a temperature of performing the melt casting on the lead is 500° C. to 700° C., and an amount of coal is 0 to 5% of a weight of the lead to be melt casted.

The advantages of the above technical solution of the present disclosure are as follows:

Compared with the pyrometallurgical method, the method of the present disclosure has low energy consumption and can meet the environmental requirement of clean production. Compared with the existing hydrometallurgical method, because of the solid phase reaction mode adopted in the method of the present disclosure, omitting the steps of leaching, cementation, electrodeposition, the process flow is simple, the operation is convenient, and the processing capacity is good. During the reaction, water does not participate in the reaction between the metal and the lead-containing material, only functions to dissolve the reaction product (sulfate or chloride of the metal), thus less water is required. The consumed zinc/iron/aluminum is produced in the product form of a sulfate or a chloride, thus the reagent cost is low.

DETAILED DESCRIPTION OF THE EMBODIMENTS

The technical problems, the technical solutions, and the advantages of the present disclosure will be more clearly described in the following description in conjunction with the accompanying drawings and specific embodiments.

Considering the problems including the existing pyrometallurgical process for processing lead paste has high energy consumption costs, and produces atmospheric pollutants such as sulfur dioxide and volatile lead dust; and the existing hydrometallurgical process for processing lead paste has long process flow, weak processing ability, the present disclosure provides a method for preparing lead directly from a lead-containing material by a solid phase reaction.

Figure 1:
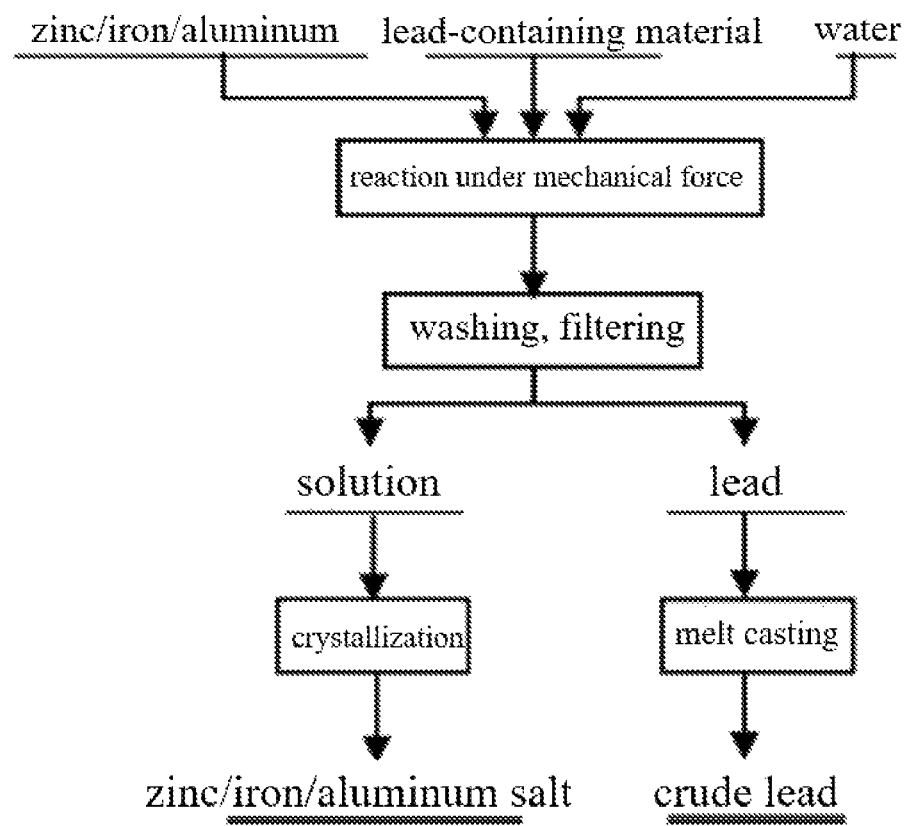
FIG. 1 is a schematic flow diagram of a method for preparing lead directly from a lead-containing material by a solid phase reaction of the present disclosure.

As shown in FIG. 1, the method for preparing the lead directly from the lead-containing material by the solid phase reaction of the present disclosure includes the following steps:

step 1, the lead-containing material to be processed is added to a grinder, and a metal substance and water are added to the grinder, an activity of the metal substance is larger than that of lead; the solid phase reaction between the lead-containing material and the metal substance is caused directly by the grinder through a mechanical force to obtain a reaction product;

step 2, the reaction product is washed and filtered to obtain the lead and a metal salt solution corresponding to the metal substance;

step 3, a melt casting is performed on the lead to obtain a crude lead, and the metal salt solution is crystallized to obtain a metal salt corresponding to the metal sub stance.

Specifically, the grinder used may be a rod mill, a stirring mill or a ball mill; the metal substance may be any one of zinc, iron, or aluminum. An amount of the metal substance used is 0.9 to 1.5 times of a theoretical amount allowing the lead in the lead-containing material to react sufficiently. If the zinc is used, the zinc may be any one or a combination of zinc powder, zinc sheets, and zinc particles; if the iron is used, the iron may be any one or a combination of iron powder, scrap iron, iron wires, and iron sheets; if the aluminum is used, the aluminum may be any one or a combination of aluminum powder, aluminum sheets, aluminum foils, and aluminum wires. The lead-containing material may be lead paste containing 60% to 75% of lead or lead residue (lead sulfate residue, lead chloride residue and lead oxide residue) containing 20% to 60% of lead. The solution obtained after the reaction is a sulfate solution or a chloride solution corresponding to the metal substance.

Figure 2:
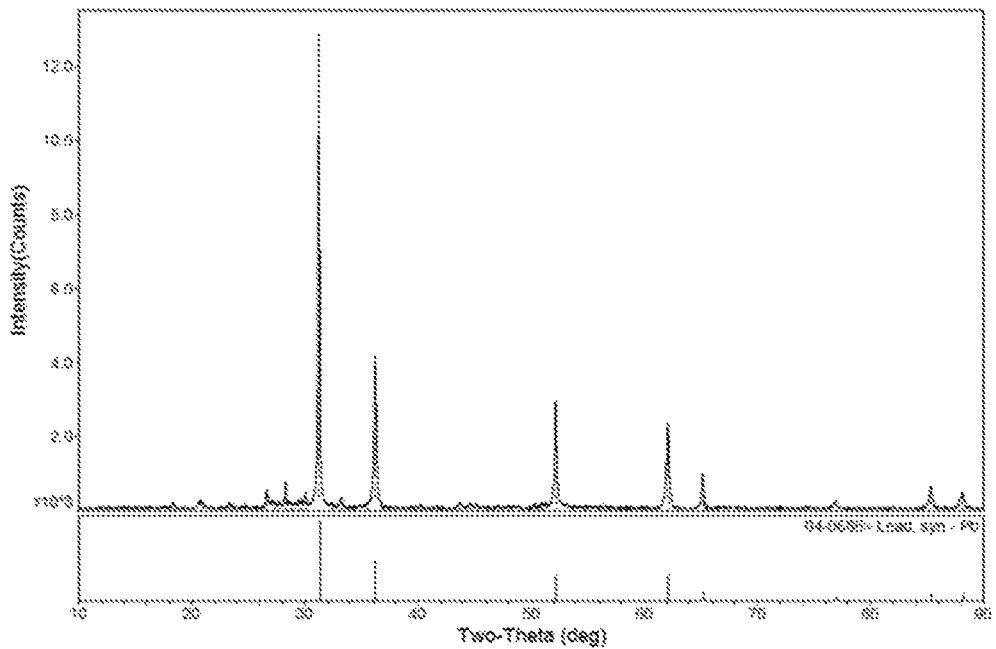
FIG. 2 is an X-ray diffraction pattern of the lead prepared directly from the lead-containing material by the solid phase reaction.

Specifically, in the above step 1, a weight ratio of a grinding medium to the reaction material in the grinder is 2 to 20:1; a ratio of water to the solid material is 0 to 5:1, and the unit of the ratio of water to the solid material is m³/t; a reaction time is 0.1 to 5 h. Moreover, when the lead-containing material is the lead paste or the lead oxide residue, sulfuric acid or hydrochloric acid is added to the water, and a pH of the solution is controlled at 1.0 to 5.0 during the reaction. In step 3, a temperature of performing the melt casting on the lead is 500° C. to 700° C., and an amount of coal used is 0 to 5% of a weight of the lead to be melt casted. The X-ray diffraction pattern of the obtained lead is shown in FIG. 2.

The main solid phase reactions occurring in the step 1 are as follows:

$$PbSO_4+Zn=ZnSO_4+Pb \quad (1)$$

$$PbSO_4+Fe=FeSO_4+Pb \quad (2)$$

$$3PbSO_4+2Al=Al_2(SO_4)_3+3Pb \quad (3)$$

$$PbCl_2+Zn=ZnCl_2+Pb \quad (4)$$

$$PbCl_2+Fe=FeCl_2+Pb \quad (5)$$

$$3PbCl_2+2Al=2AlCl_3+3Pb \quad (6)$$

The technical solution of the present disclosure will be further explained in the following specific embodiments:

Embodiment 1

Solid phase reaction: 1 kg of lead paste (Pb 70.8%) is used, an amount of zinc powder used is 1.0 times of a theoretical amount, reaction equipment is a stirring mill, a weight ratio of a grinding medium to material is 2:1, and a ratio of water to material is 0.3:1 (m³/t), sulfuric acid is added to control a pH of the reaction at 3.0, a reaction time is 0.2 h, and a lead conversion rate can reach 98.8%.

Solid-liquid separation: a reaction product after the solid phase reaction is washed and filtered to obtain lead and a zinc sulfate solution.

Lead melt casting: a melt casting temperature is 600° C., an amount of coal used is 2.5%, and the obtained crude lead contains 99.1% of lead. Crystallization: the zinc sulfate solution is crystallized to obtain a zinc sulfate product.

Embodiment 2

Solid phase reaction: 1 kg of lead paste (Pb 70.8%) is used, an amount of zinc particles used is 1.0 times of a theoretical amount, reaction equipment is a ball mill, a weight ratio of a grinding medium to material is 12:1, and a ratio of water to material is 1:1 (m³/t), sulfuric acid is added to control a pH of the reaction at 4.0, a reaction time is 1 h, and a lead conversion rate can reach 97.8%.

Solid-liquid separation: a reaction product after the solid phase reaction is washed and filtered to obtain lead and a zinc sulfate solution.

Lead melt casting: a melt casting temperature is 600° C., an amount of coal used is 2.5%, and the obtained crude lead contains 98.1% of lead. Crystallization: the zinc sulfate solution is crystallized to obtain a zinc sulfate product.

Embodiment 3

Solid phase reaction: 1 kg of lead paste (Pb 70.8%) is used, an amount of scrap iron used is 1.0 times of a theoretical amount, reaction equipment is a stirring mill, a weight ratio of a grinding medium to material is 10:1, and a ratio of water to material is 0.5:1 (m³/t), sulfuric acid is added to control a pH of the reaction at 3.0, a reaction time is 1 h, and a lead conversion rate can reach 97.6%.

Solid-liquid separation: a reaction product after the solid phase reaction is washed and filtered to obtain lead and a ferrous sulfate solution.

Lead melt casting: a melt casting temperature is 570° C., an amount of coal used is 2%, and the obtained crude lead contains 98.9% of lead. Crystallization: the ferrous sulfate solution is crystallized to obtain a ferrous sulfate product.

Embodiment 4

Solid phase reaction: 1 kg of lead paste (Pb 70.8%) is used, an amount of iron powder used is 1.1 times of a theoretical amount, reaction equipment is a stirring mill, a weight ratio of a grinding medium to material is 10:1, and a ratio of water to material is 1:1 ($m^3/t$), sulfuric acid is added to control a pH of the reaction at 3.0, a reaction time is 1 h, and a lead conversion rate can reach 98.4%.

Solid-liquid separation: a reaction product after the solid phase reaction is washed and filtered to obtain lead and a ferrous sulfate solution.

Lead melt casting: a melt casting temperature is 550° C., an amount of coal used is 1%, and the obtained crude lead contains 98.5% of lead. Crystallization: the ferrous sulfate solution is crystallized to obtain a ferrous sulfate product.

Embodiment 5

Solid phase reaction: 1 kg of lead paste (Pb 70.8%) is used, an amount of aluminum powder used is 1.0 times of a theoretical amount, reaction equipment is a stirring mill, a weight ratio of a grinding medium to material is 6:1, and a ratio of water to material is 0.5:1 ($m^3/t$), sulfuric acid is added to control a pH of the reaction at 3.0, a reaction time is 0.5 h, and a lead conversion rate can reach 98.9%.

Solid-liquid separation: a reaction product after the solid phase reaction is washed and filtered to obtain lead and an aluminum sulfate solution.

Lead melt casting: a melt casting temperature is 530° C., and the obtained crude lead contains 98.6% of lead.

Crystallization: the aluminum sulfate solution is crystallized to obtain an aluminum sulfate product.

Embodiment 6

Solid phase reaction: 1 kg of lead sulfate residue (Pb 44.6%) is used, an amount of iron powder used is 1.0 times of a theoretical amount, reaction equipment is a rod mill, a weight ratio of a grinding medium to material is 20:1, and a ratio of water to material is 0:1 ($m^3/t$), a reaction time is 0.3 h, and a lead conversion rate can reach 96.6%.

Solid-liquid separation: a reaction product after the solid phase reaction is washed and filtered to obtain lead and a ferrous sulfate solution.

Lead melt casting: a melt casting temperature is 650° C., an amount of coal used is 3%, and the obtained crude lead contains 98.1% of lead. Crystallization: the ferrous sulfate solution is crystallized to obtain a ferrous sulfate product.

Embodiment 7

Solid phase reaction: 1 kg of lead sulfate residue (Pb 44.6%) is used, an amount of aluminum foil used is 1.1 times of a theoretical amount, reaction equipment is a stirring mill, a weight ratio of a grinding medium to material is 8:1, and a ratio of water to material is 1:1 ($m^3/t$), a reaction time is 2 h, and a lead conversion rate can reach 94.6%.

Solid-liquid separation: a reaction product is washed and filtered to obtain lead and an aluminum sulfate solution.

Lead melt casting: a melt casting temperature is 620° C., an amount of coal used is 3%, and the obtained crude lead contains 98.8% of lead. Crystallization: the aluminum sulfate solution is crystallized to obtain an aluminum sulfate product.

Embodiment 8

Solid phase reaction: 1 kg of lead chloride residue (Pb 59.2%) is used, an amount of zinc sheet used is 1.0 times of a theoretical amount, reaction equipment is a ball mill, a weight ratio of a grinding medium to material is 11:1, and a ratio of water to material is 3:1 ($m^3/t$), a reaction time is 1.5 h, and a lead conversion rate can reach 96.6%.

Solid-liquid separation: a reaction product after the solid phase reaction is washed and filtered to obtain lead and a zinc chloride solution.

Lead melt casting: a melt casting temperature is 650° C., an amount of coal used is 2%, and the obtained crude lead contains 98.5% of lead. Crystallization: the zinc chloride solution is crystallized to obtain a zinc chloride product.

Embodiment 9

Solid phase reaction: 1 kg of lead oxide residue (Pb 28.8%) is used, an amount of iron powder used is 1.2 times of a theoretical amount, reaction equipment is a stirring mill, a weight ratio of a grinding medium to material is 8:1, a ratio of water to material is 5:1 ($m^3/t$), hydrochloric acid is added to control a pH of the reaction at 3.5, a reaction time is 2 h, and a lead conversion rate can reach 96.5%.

Solid-liquid separation: a reaction product after the solid phase reaction is washed and filtered to obtain lead and a ferrous chloride solution.

Lead melt casting: a melt casting temperature is 600° C., an amount of coal used is 2%, and the obtained crude lead contains 98.1% of lead. Crystallization: the ferrous chloride solution is crystallized to obtain a ferrous chloride product.

Embodiment 10

Solid phase reaction: 1 kg of lead oxide residue (Pb 28.8%) is used, an amount of iron wires used is 1.5 times of a theoretical amount, reaction equipment is a ball mill, a weight ratio of a grinding medium to material is 9:1, and a ratio of water to material is 3:1 ($m^3/t$), sulfuric acid is added to control a pH of the reaction at 3.5, a reaction time is 3 h, and a lead conversion rate can reach 92.7%.

Solid-liquid separation: a reaction product after the solid phase reaction is washed and filtered to obtain lead and a ferrous sulfate solution.

Lead melt casting: a melt casting temperature is 600° C., an amount of coal used is 2%, and the obtained crude lead contains 97.5% of lead.

Crystallization: the ferrous sulfate solution is crystallized to obtain a ferrous sulfate product.

Compared with the pyrometallurgical method, the method of the present disclosure has low energy consumption and can meet the environmental requirements of clean production. Compared with the existing hydrometallurgical method, because of the solid phase reaction mode adopted in the method of the present disclosure, omitting the steps of leaching, cementation, electrodeposition, the process flow is simple, the operation is convenient, and the processing capacity is good. During the reaction, water does not participate in the reaction between the metal and the lead-containing material, only functions to dissolve the reaction product (sulfate or chloride of the metal), thus less water is required. The consumed zinc/iron/aluminum is produced in the product form of a sulfate or a chloride, thus the reagent cost is low.

In addition, it should be noted that the term "include", "comprise" or any other variations thereof are intended to cover a non-exclusive inclusion, such that a process, a method, or an article including a series of elements includes not only those elements but also those not explicitly listed, or elements that are inherent to such a process, a method, or an article. Without more limits, the phrase of "comprising/including a . . . " which is used to define an element does not exclude the additional equivalent elements in the process, method, or article.

It should also be noted that the above is the preferred embodiments of the present disclosure, for those skilled in the art, several improvements and refinements may be made without departing from the principles of the present disclosure, these improvements and refinements should also be considered as falling within the protection scope of the present disclosure.

What is claimed is:

1. A method for preparing lead directly from a lead-containing material by a solid phase reaction, comprising the following steps:
    step 1, adding the lead-containing material to be processed to a grinder, and adding a metal substance and optionally water to the grinder, wherein the metal substance is one selected from the group consisting of zinc, iron, and aluminum, wherein a solid phase reaction between the lead-containing material and the metal substance is caused directly by the grinder through a mechanical force to obtain a reaction product,
    wherein
    the lead-containing material and the metal substance are reaction materials of the solid phase reaction,
    an amount of the metal substance is 0.9 to 1.5 times of a theoretical amount,
    the lead-containing material is a lead paste containing 60 wt % to 75 wt % of lead or a lead residue containing 20 wt % to 60 wt % of lead,
    the lead residue is one or more selected from the group consisting of a lead sulphate residue, a lead chloride residue, and a lead oxide residue,
    a weight ratio of a grinding medium to the reaction materials in the grinder is 2 to 20:1, a ratio of the water to the reaction materials is 0 to 5:1, a unit of the ratio of the water to the reaction materials is $m^3/t$, and a reaction time is 0.1 to 5 h;
    step 2, washing and filtering the reaction product to obtain the lead and a metal salt solution corresponding to the metal substance, wherein the metal salt solution is a sulfate solution or a chloride solution corresponding to the metal substance;
    step 3, performing a melt casting on the lead to obtain a crude lead, and crystallizing the metal salt solution to obtain a metal salt corresponding to the metal substance;
    wherein the steps are performed without the steps of leaching, cementation, and electrodeposition.

2. The method for preparing the lead directly from the lead-containing material by the solid phase reaction according to claim 1, wherein the grinder is one selected from the group consisting of a rod mill, a stirring mill, and a ball mill.

3. The method for preparing the lead directly from the lead-containing material by the solid phase reaction according to claim 1, wherein
    the zinc is one or more selected from the group consisting of zinc powder, zinc sheets, and zinc particles;
    the iron is one or more selected from the group consisting of iron powder, scrap iron, iron wires, and iron sheets; and
    the aluminum is one or more selected from the group consisting of aluminum powder, aluminum sheets, aluminum foils, and aluminum wires.

4. The method for preparing the lead directly from the lead-containing material by the solid phase reaction according to claim 1, wherein in the step 1, the method further comprises adding sulfuric acid or hydrochloric acid to the water, and controlling a pH of the solution at 1.0 to 5.0 during the reaction.

5. The method for preparing the lead directly from the lead-containing material by the solid phase reaction according to claim 1, wherein in the step 3, a temperature of performing the melt casting on the lead is 500° C. to 700° C., and an amount of coal is 0 to 5% of a weight of the lead to be melt casted.

* * * * *